United States Patent [19]

Symeonidis

[11] 4,289,349
[45] Sep. 15, 1981

[54] SUNROOF

[76] Inventor: Ioannis Symeonidis, 375 Virginia Ave., Jersey City, N.J. 07304

[21] Appl. No.: 55,814

[22] Filed: Jul. 9, 1979

[51] Int. Cl.³ ............................................. B60J 7/00
[52] U.S. Cl. .................................... 296/213; 296/219
[58] Field of Search ........... 296/137 R, 137 B, 137 H, 296/213, 219, 221, 222, 224; 280/DIG. 5

[56] References Cited

U.S. PATENT DOCUMENTS

| | | | |
|---|---|---|---|
| 3,972,558 | 8/1976 | Horn | 296/213 |
| 3,974,753 | 8/1976 | Blomgren et al. | 296/137 B X |
| 4,067,605 | 1/1978 | Green et al. | 296/137 B |
| 4,118,063 | 10/1978 | Bienert et al. | 296/213 |
| 4,183,576 | 1/1980 | Frymire | 296/137 B |
| 4,193,618 | 3/1980 | Lee et al. | 296/137 B X |
| 4,193,628 | 3/1980 | Sorensen | 296/137 B |

FOREIGN PATENT DOCUMENTS 37408 12/1930 France ............................ 296/137 B
466768 11/1951 Italy ............................... 296/137 B Primary Examiner—John J. Love
Assistant Examiner—Norman L. Stack, Jr.
Attorney, Agent, or Firm—Auslander, Thomas & Morrison

[57] ABSTRACT

A sunroof for a car includes a glass top hingedly interfitting with a frame. The frame includes a channel which is gasketed and overlain by the glass top. The glass top is controlled by a clip having a rocker arm lockable both open and closed. The rocker arm is spring biased for easy installation and removal of the glass top. The channel, having gaskets around both its walls, prevents moisture from seeping in when closed. The top interacts with the outer gasket to prevent rain seeping in and air rushing in while open. A drain in the channel draws off water which enters the channel normally. The configuration of the clips avoids dangerous protrusions.

6 Claims, 6 Drawing Figures

SUNROOF

The present invention relates to a new sunroof for cars. It is a modification of the inventor's Belgian Pat. No. 862,743, issued July 10, 1978.

Prior art sunroofs have been complicated to install, included complicated hardware, were expensive and did not effectively deal with the noise of rushing air while the car was in motion, nor was good provision made to maintain a dry interior while the car was in the rain with the sunroof open.

According to the present invention, a simple, inexpensive, easily installable sunroof is provided with modular parts. The sunroof is safe for the occupant of the car. The sunroof of the present invention may be left open in the rain, and while driving with the sunroof open, noise from rushing air is kept to a minimum.

The frame of the sunroof is snugly attached to the roof of a car in a manner to maintain the rigidity of the roof without rippling. The frame has a flange overlying the roof of the car and a deep-set channel into which the glass is set flush with the roof of the car when closed.

The channel includes an upright lip and an upright portion to receive gaskets. Hinges are set inside the recessed part of the frame to receive the fingers of the glass hinges. A clip locks the glass in open position or in closed position. The clip lies flat against the inside of the roof of the car, with a minimum protrusion for safety of the occupants. A simple spring-loaded mechanism is used to install or remove the clip and the glass.

Although such novel feature or features believed to be characteristic of the invention are pointed out in the claims, the invention and the manner in which it may be carried out, may be further understoody by reference to the description following and the accompanying drawings.

Referring now to the figures in greater detail, where like reference numbers denote like parts in the various figures.

Figure 1:
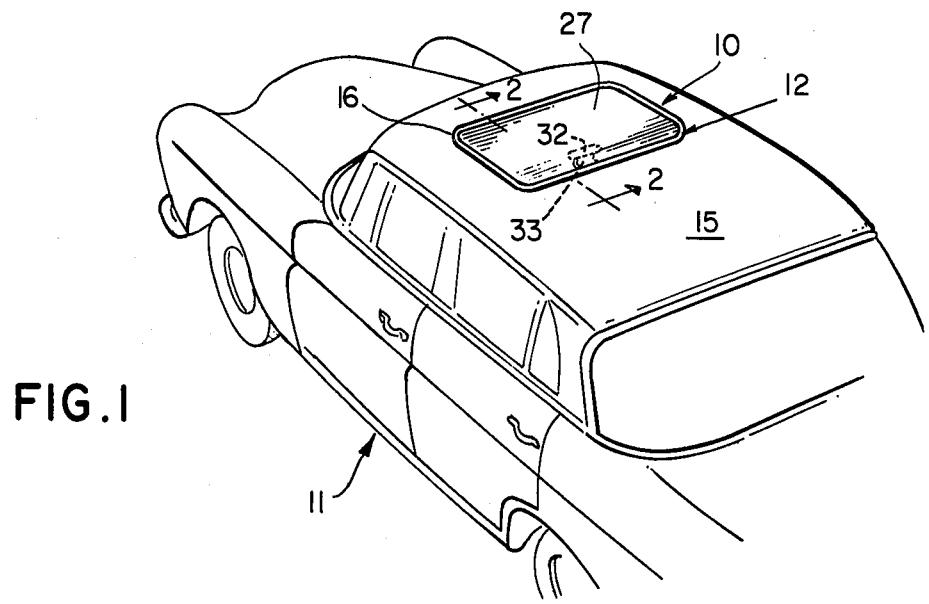
FIG. 1 is an isometric view of a car with a sunroof of the present invention.

As shown in FIG. 1, the sunroof 10 lies flush on the roof 15 of the car 11 with frame 12 slightly overriding the roof 15 of the car 11.

Figure 2:
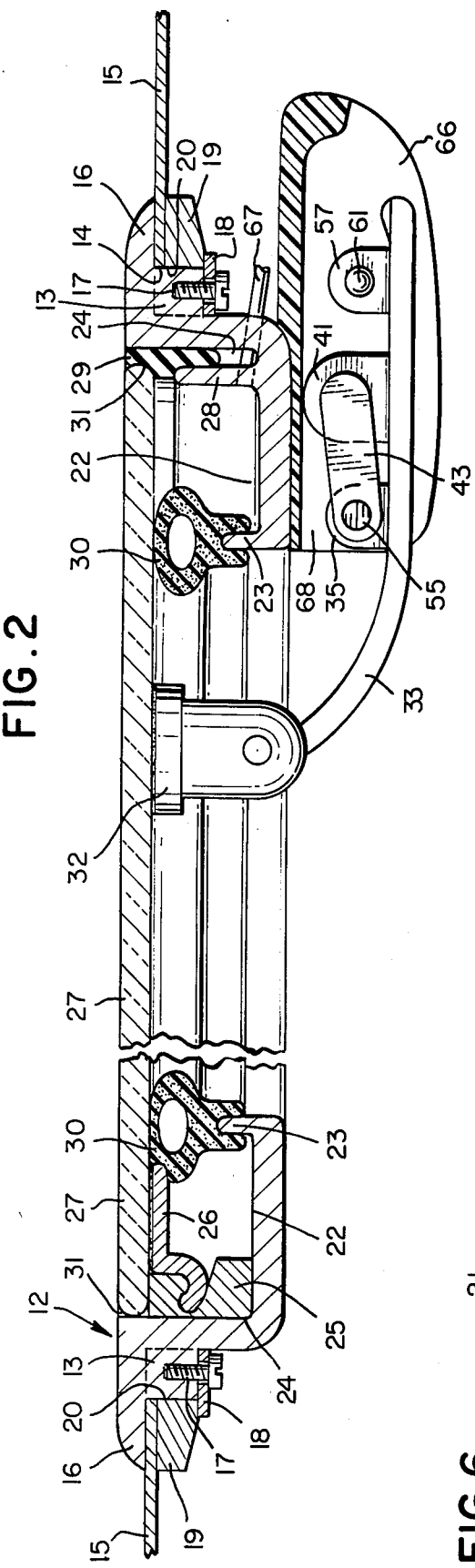
FIG. 2 is a section of FIG. 1 at lines 2—2.
Figure 5:
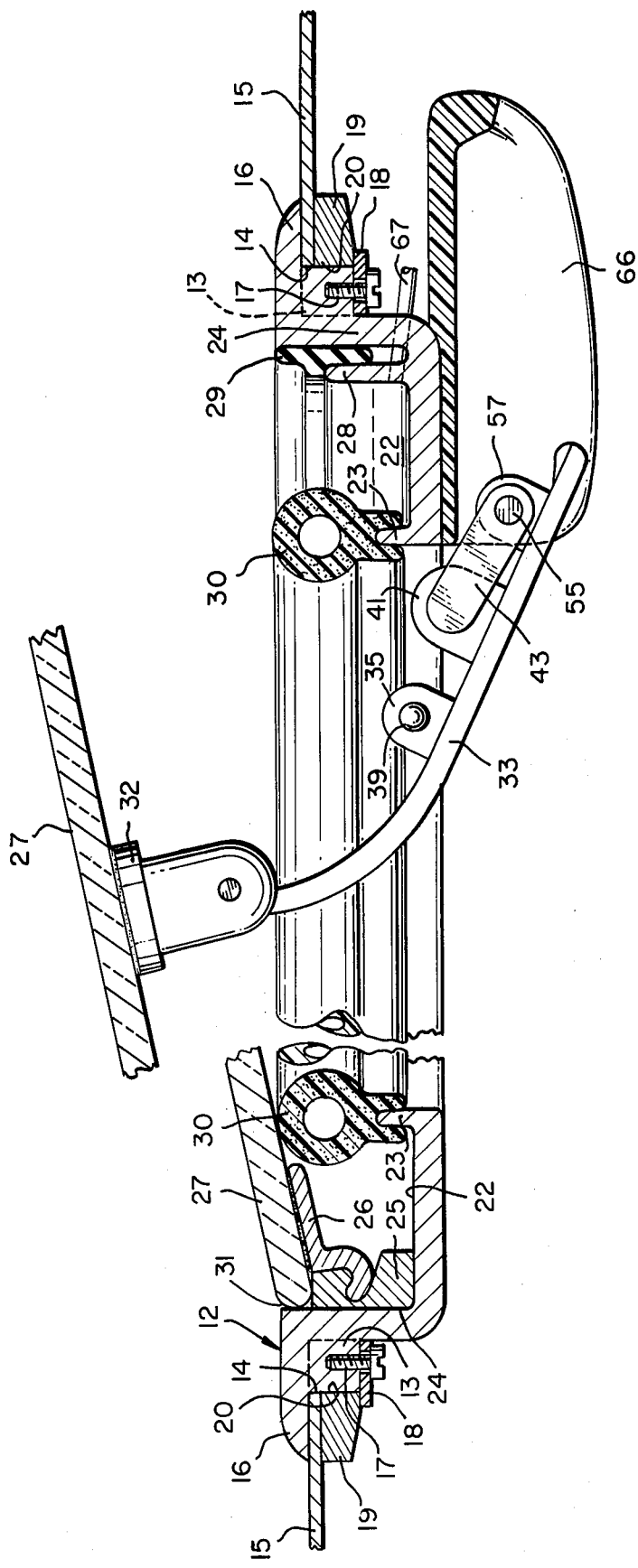
FIG. 5 is a view of FIG. 2 with the sunroof in open position.

As shown in FIGS. 2 and 5, the frame 12 includes several depending blocks 13 about its periphery, which abut the inner periphery of the opening 14 in the roof 15 of the car 11. The frame 12 fits snugly into the opening 14 in the roof 15 of the car 11 with the spaced blocks 13 abutting the roof 15. The upper flange 16 overrides the roof 15. The frame 12 is held firmly to the roof by screws 17 with washers 18. The screws 17 screw into the blocks 13. The washers 18 extend beyond the blocks 13 to override the portions of the grasping flanges 19.

Figure 6:
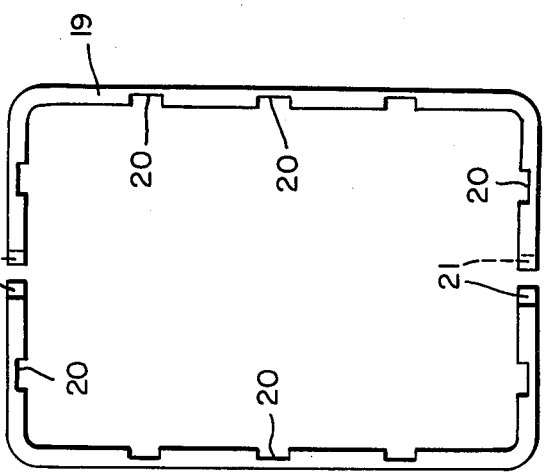
FIG. 6 is a top plan view of the two portions of the frame-grasping flange.

As can be seen in FIG. 6, the grasping flanges 19 include recesses 20 to interlock with the blocks 13. The grasping flanges 19 are preferably modular with stepped ends 21, which can overlap to form a complete ring about the frame 12.

Inside the frame 12 is a channel 22 defined by the lip 23 and inner peripheral wall 24 of the frame 12. Within the channel 22 are set the glass hinge interlocks 25 and glass hinge fingers 26. The fingers 26 are cemented to the glass top 27.

Within the channel 22 and between the inner peripheral wall 24 is a second lip 28, spaced away from the peripheral wall 24, and following the circumference of the channel 22, with breaks only for the portions of the channel 22, which include the hinge interlocks 25. A gasket 29 is set in the space between the peripheral wall 24 and the second lip 28 and is lined around the periphery of the frame 12, breaking only for the hinge interlocks 25. A second gasket 30, preferably round and flexible, is set around the channel 22 on the lip 23.

The glass top 27 fits snugly within the opening in the frame 12. The glass top 27 lies flush with the car roof 15 and rests in closed position on the gaskets 29, 30. The edges 31 of the glass top 27 are preferably rounded. The glass top 27 is also preferably in close contact with the interlock hinge 25, which are contiguous with the gasket 29. The glass top 27 is preferably cemented to a clip base 32, having a hingedly connected arm 33.

Figure 4:
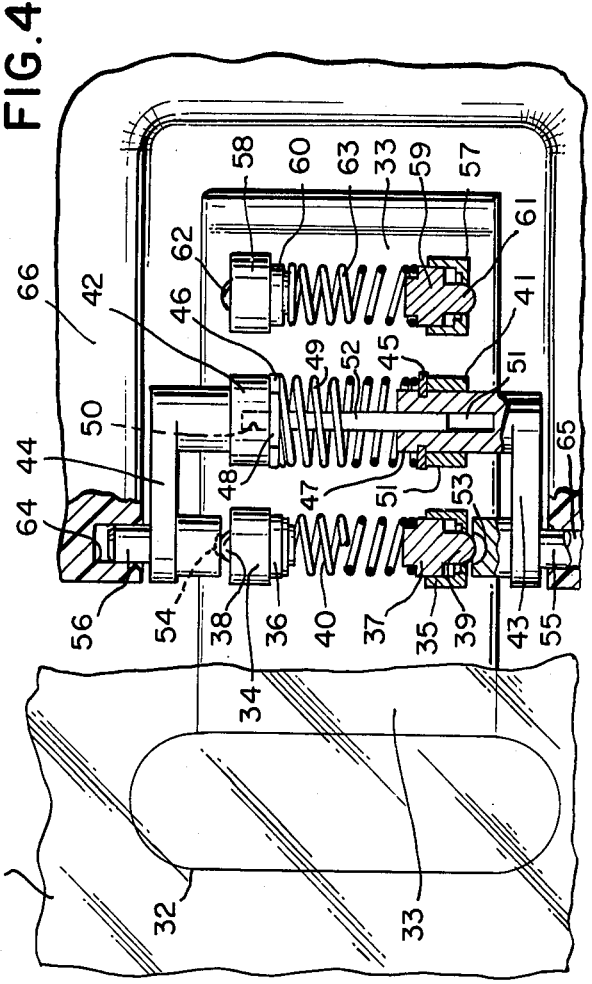
FIG. 4 is a section of FIG. 2.

As can be seen in FIG. 4, a first pair of uprights 34, 35 project outwardly from the arm 33. Engaged in the uprights 34, 35 are a pair of inserts 36, 37 which have rounded protrusions 38, 39, extending through the openings in the uprights 34, 35. A spring 40 is biased against the inserts 37, 38, normally holding them in the uprights 34, 35 with the protrusions 38, 39 extending outward.

A pair of rocker arms 43, 44 rotatably extend through the opening in the upright supports 41, 42. The rocker arms 43, 44, each include C rings 45, 46 engaged around collars 47, 48, holding the rocker arms 43, 44 from disengagement in the upright supports 41, 42. The spring 49 is biased against the C rings 45, 46, maintaining the rocker arms 43, 44 extending from the upright supports 41, 42. Each rocker arm 43, 44 includes a rectangular opening 50, 51, adapted to receive a spanning rectangular rod 52. The rocker arms 43, 44 each include declevities 53, 54, adapted to interact with the protrusions 38, 39. The rocker arms 43, 44 also include outwardly extending pivots 55, 56.

A second pair of uprights 57, 58 project from the arm 33. Engaged in the uprights 57, 58 are a pair of inserts 59, 60, which have rounded protrusions 61, 62 extending through the openings in the uprights 57, 58. A spring 63 is biased against the inserts 59, 60, normally holding them in the uprights 57, 58 with a protrusion 61, 62 extending outward. The declevities 53, 54 in the rocker arms 43, 44 also interact with the protrusions 61, 62.

Figure 3:
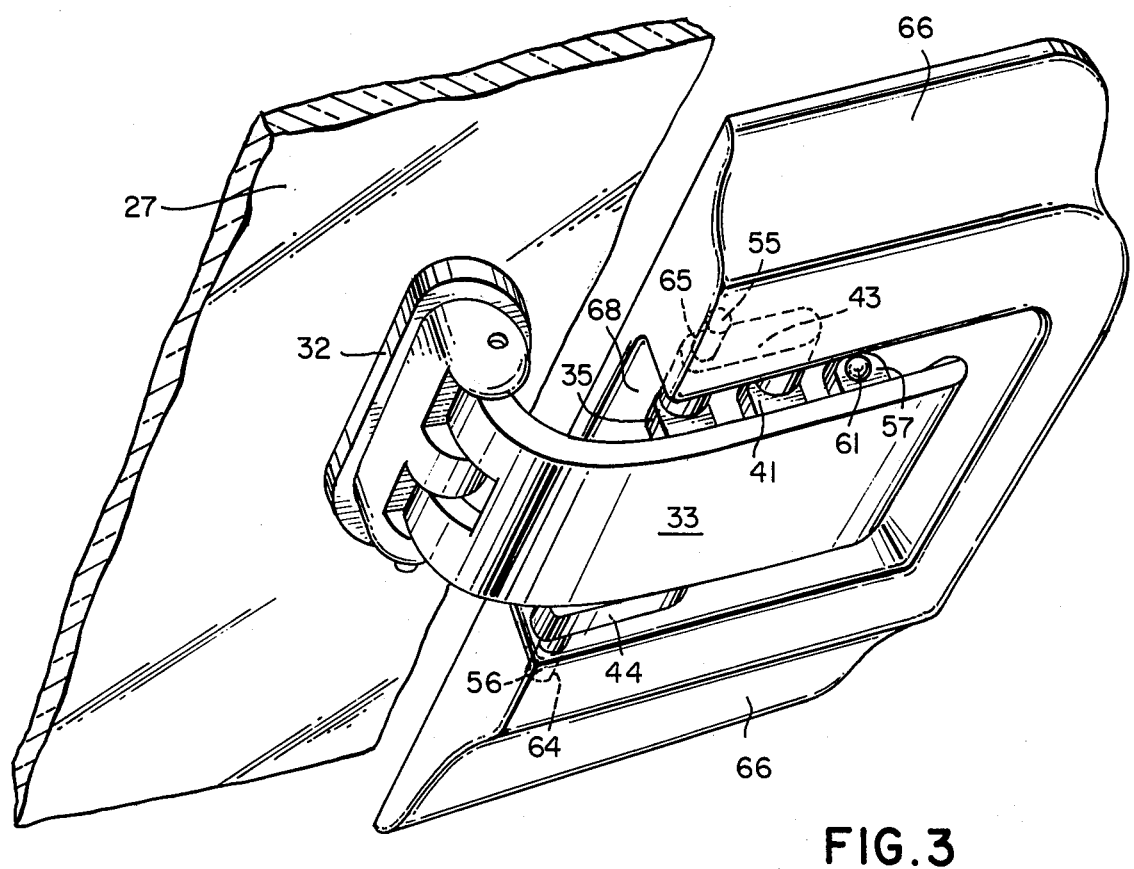
FIG. 3 is an isometric detail of the clip as shown in FIG. 2.

The pivots 55, 56 are engagable in the openings 64, 65 as indicated in FIG. 3, held in a safety molding 66.

A drain 67 extends from the channel 22, through the frame 12, through the second lip 28 and is connected to the normal internal drainage system of the car 11.

Normally, the opening 14 is prepared in the roof 15 of the car 11, dimensioned to hold the frame 12 steadily engaged with the blocks 13 tangent to the inner periphery of the opening 14. The flange 16, in extending beyond the blocks 13, overlies the roof 15 of the car 11. The grasping flanges 19 are engaged inside the car 11 on the underside of the roof 15 with the recesses 20 engaging the blocks 13.

It is preferable to have modular grasping flanges 19, thus there may be more recesses 20 on the grasping flanges 19 than there are blocks 13, to accommodate any differences in the frame 12 structure.

The screw 17 with washers 18 when tightened, hold the roof 15 of the car 11 between the upper flange 16 and the grasping flanges 19 in tight engagement, which normally prevents any rippling of the roof 15.

The glass hinge interlocks 25 may be in position when the frame 12 is secured. There are preferably two spaced glass hinge interlocks 25 (the second not shown) in the frame 12. Once the gaskets 29, 30 have been set in position, the glass top 27 may be put in position. The hinge fingers 26 (one not shown) are cemented to the glass top 27. The clip base 32 is also cemented to the glass top 27. Although other means of attachment may be used, such cementing techniques have proven satisfactory.

The hinge fingers 26 may be simply engaged in the hinge interlocks 25. The arm 33, then depending from base 32, is swung into the opening in the frame 12. The rocker arms 43, 44 are then squeezed inward against the bias of the spring 49 so that the pivots 55, 56 may be engaged in the openings 64, 65 in the safety molding 66. The rectangular rod 52 is long enough to hold itself in the rectangular openings 50, 51, with sufficient space to allow the rocker arms 43, 44 to be squeezed inward for mounting the pivots 55, 56 in the openings 64, 65.

The rectangular rod 52, engaged in the openings 50, 51, acts as a torsion rod, providing simultaneous movement of both rocker arms 43, 44, while still allowing the rocker arms 43, 44 to be squeezed inward against the biasing of the spring 49, so that the pivots 55, 56 may be engaged or disengaged in the openings 64, 65. This makes more easy installation and removal of the glass top 27.

Once the hinge fingers 26 and pivots 55, 56 have been engaged in the hinge interlocks 25 and openings 64, 65 respectively, the glass top 27 is secure in the frame 12.

The arm 33 pivoting on the pivots 55, 56 holds the glass top securely closed by the engagement of the declevities 53, 54 with the protrusions 61, 62. The arm 33 lies flat within a channel 68 in the safety molding 66 so that there are no dangerous protrusions inside the car 11.

In open position, as can be seen in FIG. 5, the rocker arms 43, 44 are held in position with the declevities 53, 54, engaging the protrusions 38, 39. In open position, the end of the arm 33, as a safety measure, does not protrude beyond the safety molding 66.

When the glass top 27 is closed, it is flush with the roof 15 and rests against the gaskets 29, 30 and flat against the upper portion of the hinge interlock 25, keeping all air and water from coming into the car 11.

While driving with the glass top 27 open, the edge 31 of the glass top 27 lies against the gasket 29 (not shown) and flat against the hinge interlock 25, preventing any noise from the rush of air to be disturbing inside the car 11. In the open position, the compressible gasket 30 still maintains contact with the glass top 27, further keeping out both air and rain.

With the glass top 27 open in the rain, whenever water may tend to get inside the car 11, is generally caught in the channel 22 and is carried out through the drain 67, which is joined by tubing (not shown) to the normal drain channels of the car 11.

The terms and expressions which are employed are used as terms of description; it is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. A sunroof for a car comprising a frame, said frame including an open upright channel inside said frame, said channel defined by the wall of said frame and a lip spaced away from the wall of the frame, a first gasket means around the wall of said frame, a second gasket means around the lip, a glass top, said glass top adapted to be hingably mounted within said frame and in contact with said first and second gasket means when in closed position, said glass top further adapted to be substantially in contact with at least said first gasket means along the side of the frame juxtaposed to said hinge whereby air is substantially prevented from passing between said glass top and said first gasket at said side of said frame, and a drain in said frame, said drain from the bottom of said channel through said frame, whereby rain may be carried from said channel when said glass top is in open position.

2. The invention of claim 1 including a second lip said second lip adjacent said frame wall and adapted to hold said gasket around the wall of said frame.

3. The invention of claim 1 wherein said frame includes an upper flange, a plurality of blocks spaced outside said frame, beneath said upper flange, flange means, said flange means including a plurality of recesses, said recesses adapted to receive said blocks, and means to join said frame at said blocks adapted to hold the edge of a car roof firmly between said upper flange and said flange means.

4. The invention of claim 1, 2 or 3, including an arm, means hingably mounting said arm to said glass top, upright support means extending from said arm, rocker arm means pivotably mounted in said upright support means, an extending end of said rocker arm means pivotably mounted adjacent said frame, a first upright means on one side of said upright support means, a second upright means on the other side of said upright support means, and means to selectably lock said rocker arm means with said first or second upright means whereby said glass top may be locked open or closed.

5. The invention of claim 4 wherein at least one said upright means comprises a pair of uprights, inserts engagable in said uprights, said inserts including protrusions, spring means, said spring means biased to extend said protrusions from said upright means, said rocker arm including means to interlock with said protrusions on said inserts in said pair of uprights.

6. The invention of claim 1, 2 or 3, including an arm, means hingably mounting said arm to said glass top, upright support means extending from said arm, said upright support means comprising a pair of upright supports, rocker arm means pivotably mounted in said upright support means, said rocker means comprising a pair of rocker arms, spring means, said spring means biased to extend said rocker arms through said upright supports, torsional connecting means, said torsional connecting means torsionally connecting said rocker arms for simultaneous movement, said rocker arms slidable on said torsional connecting means against the bias of said spring means, an extending end of said rocker arm means pivotally mounted adjacent said frame, a first upright means on one side of said upright support means, a second upright means on the other side of said upright support means, and means to selectably lock said rocker arm means with said first or second upright means whereby said glass top may be locked open or closed.

* * * * *